May 28, 1957 E. C. HERKENHOFF 2,793,748
METHOD OF SEPARATION EMPLOYING TRUNCATED CYCLONE
Filed April 24, 1951 2 Sheets-Sheet 1
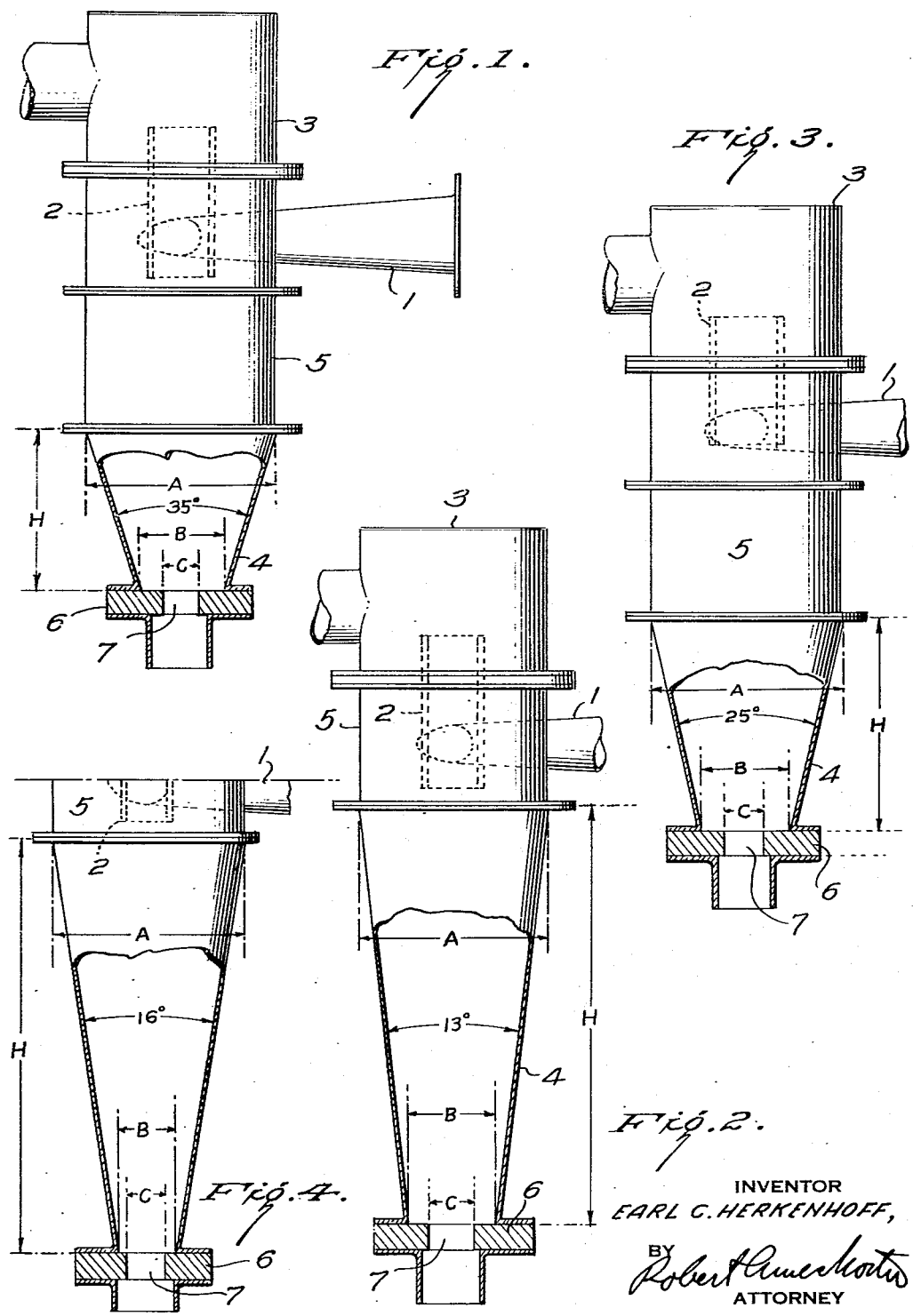
INVENTOR
EARL C. HERKENHOFF,
BY
ATTORNEY

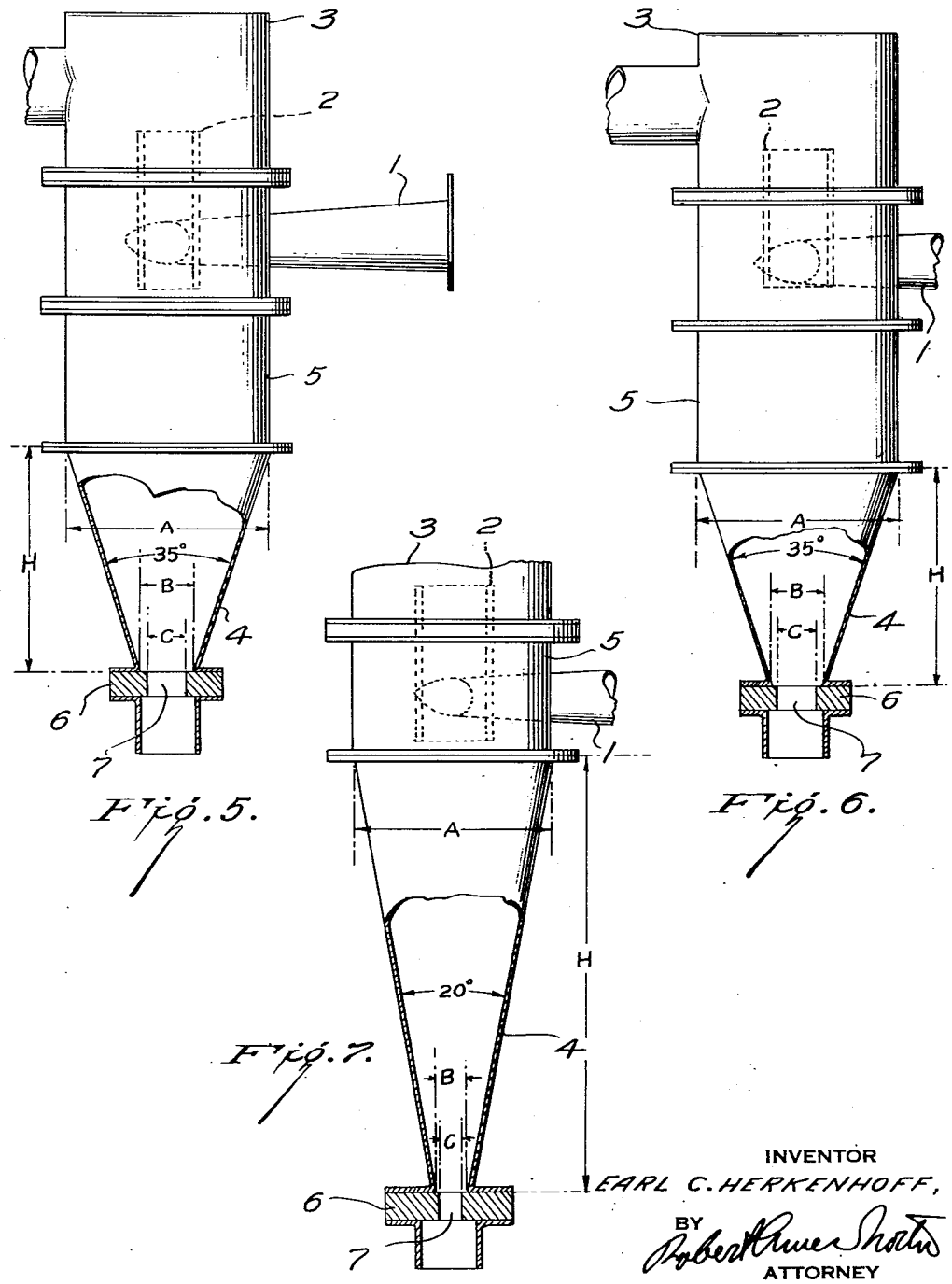

United States Patent Office 2,793,748
Patented May 28, 1957

2,793,748

METHOD OF SEPARATION EMPLOYING TRUNCATED CYCLONE

Earl Conrad Herkenhoff, Hibbing, Minn., assignor, by mesne assignments, to Stamicarbon N. V. (Stamicarbon, Ltd.), Heerlen, Netherlands Application April 24, 1951, Serial No. 222,713

4 Claims. (Cl. 209—144)

This invention relates to a method for separating fragmentary materials employing a cyclone separator.

There has been developed an important method of separating fragmentary materials on the basis of specific gravity differences using a cyclone and a separating medium comprising a suspension of finely divided heavy solids in a liquid such as water. The medium solids may be a portion of the ore feed, an autogenous medium, or may be separately added as an exogenous medium. In the latter case, it is usually desirable to employ magnetizable medium solids, such as magnetite, ferrosilicon, and the like, because of the ease of cleaning them magnetically from the finely divided slimes which are present in the ore or which form in the separatory process.

The medium and fragmentary materials such as ores are injected tangentially into the upper part of the conical part of the cyclone. Two vortices are produced turning in the same direction, but possessing opposite axial movements. The inner vortex moves to the base of the cone and the outer vortex to a discharge opening or orifice at the apex. Under the centrifugal force which obtains in the vortices and which will normally be much greater than the force of gravity, fragmentary material of higher specific gravity than the gravity of the separatory medium is thrown out into the outer vortex and discharged through the apex opening, and lighter material is discharged from the inner vortex through the base of the apparatus. The cyclone separation process is described in U. S. Patent No. 2,543,689.

The cyclonic method of separating fragmentary materials of differing specific gravity has achieved great commercial success. It has many advantages, such as very high capacity in a small space, ability to handle fine fragmentary materials, and the like. With some ores, however, the sharpness of separation is not always perfect. For example, with iron ores in which the gangue may be silica, such as quartz, it is of utmost importance to obtain an iron concentrate containing a minimum amount of silica in order to meet the needs of blast furnace practice. The silica content of the apex discharge in the case of many iron ores has proven to be higher than desired for a premium product suitable for blast furnace use.

The present invention is directed to an improved method of cyclonic separation, particularly with ores where a maximum grade of apex discharge is of prime importance. I have found that if the conical part of the cyclone is truncated and a shelf with a smaller central opening closes the lower truncated end, improved results are obtainable, provided the relative dimensions, which includes the degree of truncation, are maintained within certain definite ratios. If the dimensions fall outside of these ratios, the improved grade of apex discharge is no longer obtained and the results approach or approximate those obtained with the ordinary, standard cyclone of commerce. The ranges of the dimensions on which the present invention is based will be set forth in connection with the drawings in which:

Figures 1 to 4 are elevations, partly broken away, of cyclones coming under the dimensions usable in present invention, and, Figures 5 to 7 are elevations, partly broken away, of cyclones which fall outside of the dimensions usable in present invention.

All of the cyclones are provided with the conventional tangential medium inlet 1, a central vortex finder 2, and discharge head 3. In every case there is a conical portion 4, which is the critical part of the cyclone. As is common, in certain of the cyclones such as Figures 1, 2, 5, and 6, there are cylindrical portions 5 betweeen the inlet and the conical portion. The cones are all truncated, including a shelf or bottom portion 6 provided with a central opening 7. In the drawings the dimensions are given as follows:

A is the maximum diameter of the conical section.
B is the diameter at the point of truncation.
C is the diameter of the central opening or orifice 7.
H is the height of the truncated cone.

In general, the dimensions of the discharge opening C are governed by the size of the largest fragmentary material to be handled in the cyclone. In practical operation, this opening will not be less than one-half inch and may be considerably larger in a large cyclone. The size of the discharge opening is not materially changed by the present invention and will in general be approximately the same as in the ordinary cyclone of the same size and handling the same type of material.

In order to obtain the benefits of the present invention, certain relative dimensions of the truncated cone portion of the cyclone fall within the following ranges:

$$\frac{A}{B} \text{ is } 1.5 \text{ to } 3.0$$

$$\frac{B}{C} \text{ is } 1.65 \text{ to } 3.0$$

$$\frac{H}{A} \text{ is } 0.5 \text{ to } 3.0$$

The first two ratios are somewhat more critical than $$\frac{H}{A}$$

However, it is necessary that all three dimensional ratios fall within the ranges given.

In order to illustrate the importance of the dimensions, the cyclones of Figures 1 to 7 were tested on a Minnesota iron ore taken from plant feed over a period of several months. The plant feed varied from a low of about 50% iron to a high of about 57%. The medium solids mixture was 80% magnetite, 20% ferrosilicon. The cyclones were of small pilot plant size and all had the same maximum diameter. The following table shows the grade of concentrate obtained. It should be understood that for best commercial products the $SiO_2$ should be below 10%.

| Cyclone Fig. | $\frac{B}{C}$ | $\frac{A}{B}$ | $\frac{H}{A}$ | Percent $SiO_2$ |
|---|---|---|---|---|
| 1 | 2.1 | 2.10 | 0.89 | 6.35 |
| 2 | 2.3 | 2.0 | 1.10 | 7.91 |
| 3 | 2.15 | 2.10 | 2.20 | 8.04 |
| 4 | 1.65 | 3.0 | 2.2 | 9.08 |
| 5 | 1.33 | 3.75 | 1.13 | 10.57 |
| 6 | 1.3 | 3.75 | 1.11 | 11.08 |
| 7 | 1.4 | 4.8 | 2.2 | 12.72 |

As in all tests involving a practical and somewhat varying feed the results are averages over at least a day's operation with each design of cyclone.

From the preceding table it will be noted that the ratios $$\frac{A}{B}$$

and $$\frac{B}{C}$$

are quite critical, whereas the change introduced by $$\frac{H}{A}$$

is much less marked. The effects of the varying ratios on the shape of the cyclones are clearly brought out in the drawings, which are all to the same scale. Figures 5 to 7, which represent dimensions falling beyond the range of the present invention, approach the conditions obtained in an ordinary cyclone. This is particularly true in the case of Figures 6 and 7.

It is not known why truncated cyclones result in such marked improvement in the grade of apex concentrate. Obviously, the result is less contamination with light material from the central vortex. It is possible that the fact that the outer vortex is further out from the center of the cyclone at its truncated apex may result in a more thorough separation near this point because the flow out through the center opening is baffled by the bottom plate or shelf, 6. It is, however, quite possible that other features are present and are the most important ones. In any event, extended tests show that the improved results of the present invention are only obtained within the ranges of ratios given above. Therefore, it is not intended to limit the invention to any theory of operation.

In the claims the letters A, B, C, and H will be used in the same sense as in the specification, namely, A is the maximum diameter of the truncated cone, B is the diameter at truncation, C is the apex opening, and H represents the height from the truncation to the point of maximum diameter.

I claim:

1. A continuous method of separating solid particles of different specific gravities comprising feeding under pressure tangentially into one portion of a confined circular space including a truncated conical portion, a suspension in a liquid of a mass of such particles whereby the suspension is caused to move in a cyclonic vortex within the circular space at a velocity producing centrifugal forces substantially in excess of gravity, said suspension including particles of substantially finer size than the remainder of the particles and of a specific gravity higher than a predetermined specific gravity of separation, discharging the heavier particles from the truncated end of the conical space opposite the point of infeed through a central orifice in a transverse flat surface at the small end of the truncated conical space, discharging the light particles from the circular space through a second outlet adjacent the point of infeed, the relative dimensions of the truncated conical space being within the following ratios:

$$\frac{A}{B}, 1.5 \text{ to } 3.0$$

$$\frac{B}{C}, 1.65 \text{ to } 3.0$$

$$\frac{H}{A}, 0.5 \text{ to } 3.0$$

where A is the maximum diameter of the conical section, B is the diameter at the point of truncation, C is the diameter of the central opening or orifice, and H is the height of the truncated cone.

2. A method according to claim 1 in which the finer particles are magnetizable.

3. A method according to claim 2 in which the solid particles of differing specific gravity to be separated comprise particles of an iron ore.

4. A method according to claim 3 in which the iron ore contains its iron content substantially in the form of oxide and comprises siliceous gangue.

References Cited in the file of this patent

UNITED STATES PATENTS

| | | |
|---|---|---|
| 2,543,689 | Driessen | Feb. 27, 1951 |

FOREIGN PATENTS

| | | |
|---|---|---|
| 71,894 | Norway | Mar. 31, 1947 |
| 608,026 | Great Britain | Sept. 8, 1948 |
| 980,967 | France | May 21, 1951 |

OTHER REFERENCES

Article entitled "American Tests of a Cyclone Coal Washer Developed in Netherlands," by M. R. Geer and H. F. Yancey, in the American Institute of Mining and Metallurgical Engineers, T. P. 2136 of 1947, pages 2 and 3.

Fuel Research Institute of So. Africa Report No. 17 of 1949 (operating characteristics of the cyclone washer) (summary (No. p. number) and conclusion page 36).